United States Patent Office 3,530,054
Patented Sept. 22, 1970

3,530,054
ELECTRODEPOSITION OF ADDITION PRODUCT PARTIAL ESTER AND AMINE-ALDEHYDE CONDENSATION PRODUCT
J. Alden Erikson, Gibsonia, and Donald P. Hart, Allison Park, Pa., assignors to PPG Industries, Inc., a corporation of Pennsylvania
No Drawing. Filed Dec. 28, 1964, Ser. No. 421,590
Int. Cl. B01k 5/02; C09d 3/48; C23b 13/00
U.S. Cl. 204—181
10 Claims

ABSTRACT OF THE DISCLOSURE

Vehicles which can be employed in water-dispersed coating compositions adapted for use in electrodeposition processes comprise a fatty acid ester-acid anhydride addition product partially esterified with a diol, and an amine-aldehyde condensation product. The addition product-partial ester and the amine-aldehyde condensate are preferably reacted together and when applied by electrodeposition provide coatings in which the proportion of amine-aldehyde condensate is substantially the same as in the coating composition.

---

Although electrodeposition of certain materials has been practiced to some extent heretofore, most coating compositions which form desirable films and coatings when applied by conventional techniques cannot be satisfactorily applied by electrodeposition. Moreover, electrodeposition of many coating materials, even when otherwise successful, often produces films having relatively poor coating properties.

Compositions based on reaction products of fatty acid esters and acid or acid anhydrides have recently been developed for use in electrodeposition processes. Certain of these are disclosed, for example, in copending applications Ser. No. 222,674, filed Sept. 10, 1962, now U.S. Pat. 3,366,563 and Ser. No. 282,880, filed May 24, 1963 now U.S. Pat. 3,369,983. These compositions, while providing coatings having excellent properties for most purposes, are not entirely satisfactory for some applications.

It has long been known that amine-aldehyde resins impart desirable characteristics to coatings. Hence, the addition of such materials to electrodeposited coatings could be expected to provide improved properties. In many cases, however, a serious problem in attempting to utilize amine-aldehyde products in compositions to be electrodeposited has been the inability to obtain satisfactory codeposition of the amine-aldehyde product and the other components of the coating composition. This is especially true in compositions in which the other components comprise a fatty acid ester-acid anhydride addition product, e.g., a maleinized oil.

It has now been discovered that certain modified fatty acid ester-acid anhydride reaction products combined with certain amine-aldehyde condensation products provide vehicles of improved properties which can be employed in water-dispersed coating compositions adapted for use in electrodeposition processes. Coatings thus deposited have highly desirable properties and, moreover, contain substantial amounts of the amine-aldehyde condensation product, their composition being approximately the same as that of the dispersed coating composition employed.

The vehicles herein comprise the partial ester of a diol and the addition product of a drying oil fatty acid ester and an anhydride of an alpha, beta-ethylenically unsaturated dicarboxylic acid, or of such an acid which forms an anhydride. Along with these partial esters, there is employed a substantially completely alkylated amine-aldehyde condensation product.

Because the suitability of coating compositions for electrodeposition is both unpredictable and difficult to achieve, emphasis is placed herein upon the utility of the vehicles of this invention in water-dispersed coating compositions applicable by electrodeposition processes. However, it should be noted that these vehicles can also be employed in compositions to be applied by any conventional means, such as by brushing or rolling. The water-dispersed compositions can, moreover, be utilized in compositions designed for application by dipping and their use in this manner, for example, as a dip primer, is advantageous in many instances, giving increased salt-spray resistance and other improved properties. Thus, it is not intended that the invention be limited by the discussion and examples herein relating to electrodeposition, although the usefulness of these vehicles and compositions in such processes makes them especially valuable.

The improved vehicles of the present invention comprises a modified reaction product or adduct of a drying oil fatty acid ester with a dicarboxylic acid or anhydride. (Included within the term "drying oil" are the so-called "semi-drying oils.") By drying oil fatty acid esters are meant esters of fatty acids which are or can be derived from drying oils (or semi-drying oils), or from such sources as tall oil. Such fatty acids are characterized by containing at least a portion of unsaturated fatty acids. Preferably, the drying oil per se is employed. Generally, drying oils are those oils which have an iodine value of at least about 90, with those having an iodine value of about 90 to 130 being sometimes considered as semi-drying oils. These iodine values are determined by method ASTM–D1467–57T. Examples of such esters include linseed oil, soya oil, safflower oil, perilla oil, tung oil, oiticica oil, poppyseed oil, sunflower oil, tall oil esters, walnut oil, dehydrated castor oil, herring oil, menhaden oil, sardine oil and the like.

Also included are esters modified with other acids (or their anhydrides), including saturated, unsaturated or aromatic acids, such as butyric acid, stearic acid, linoleic acid, phthalic acid, isophthalic acid, terephthalic acid or benzoic acid, or an acid material such as rosin. The acid modified esters are made by transesterification of the ester, as by forming a di- or monoglyceride by alcoholysis, followed by esterification with the acid, or by reacting oil acids with a polyol and reacting the acid with the partial ester. In addition to glycerol, alcoholysis can be carried out using other polyols, such as trimethylolethane, trimethylolpropane, pentaerythritol, sorbitol and the like. The esters can also be modified with ethylenic monomers such as cyclopentadiene or styrene, or other esters of unsaturated fatty acids, for example, those prepared by the esterification of tall oil fatty acids with polyols, can be utilized.

Also included within the term "drying oil fatty acid ester" as set forth herein, are alkyd resins prepared utilizing drying oils; esters of epoxides with such fatty acids, including esters of diglycidyl ethers of polyhydric compounds as well as other mono-, di- and poly-epoxides; drying oil fatty acid esters of polyols, such as butanediol, trimethylolethane, trimethylolpropane, trimethylolhexane, pentaerythritol and the like; and drying oil fatty acid esters of resinous polyols, such as homopolymers or copolymers of unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha, beta- ethylenically unsaturated dicarboxylic acid anhydride can be employed to produce the products described herein. These include such anyhydrides as maleic anhydride, which is preferred, and itaconic anhydride and other similar anhydrides. Instead of the anhydride, there may also be used ethylenically unsaturated dicarboxylic acids which form anhydrides, for example, maleic acid or itaconic acid. These acids appear to function by first forming the anhydrides. Fumaric acid may also be utilized, although in many instances it requires more stringent conditions than the unsaturated dicarboxylic acid anhydrides or acids which form anhydrides. Mixtures of any of the above acids or anhydrides may also be utilized. Generally speaking, the anhydride or acid employed contains from 4 ot 12 carbon atoms, although longer chain compounds can be used if so desired.

While the exact nature of the reaction product of the acid or anhydride with the fatty acid ester is not known with certainty it is believed that the reaction takes place by addition of the unsaturated linkage of the acid or anhydride to the carbon chain of the oil. In the case of nonconjugated double bonds such as are present in linseed oil, the reaction may take place with the methylene group adjacent the conconjungated double bond. In the case of oils having conjugated double bonds, such as tung oil, the reaction is probably of the Diels-Alder type.

The reaction between the acid or acid anhydride and the drying oil or semi-drying oil fatty acid ester takes place readily without the use of a catalyst and at temperatures in the range of about 100° C. to about 300° C. or higher, with the reaction generally being carried out between about 200° C. and about 250° C. If desired, the product can be further heated to increase its viscosity. Such heat treated products can provide better stability and improved properties.

While the reaction products can be comprised solely of adducts of the fatty acid ester and the dicarboxylic acid or anhydride, in many instances it is desirable to incorporate into the reaction product another ethylenically unsaturated monomer. For this purpose, any ethylenically unsaturated monomer, preferably containing a single $CH_2=C<$ group, can be employed. Examples of such monomers include those described by the formula:

(I) $\qquad R_1—C=C—R_4$
$\qquad\qquad\;\;\;\;|\;\;\;\;|$
$\qquad\qquad\;\;\;R_2\;R_3$ where $R_1$ and $R_2$ are hydrogen or alkyl, $R_3$ is hydrogen alkyl or carboxyalkyl, and $R_4$ is cyano, aryl, alkyl, alkenyl, aralkyl, alkaryl, alkoxycarbonyl or aryloxycarbonyl. The preferred compounds are styrene, substituted styrene, alkyl acrylates, alkyl methacrylates, diolefins and acrylonitrile.

The reaction of the fatty acid ester, the acid or anhydride, and any additional unsaturated monomer or monomers can be carried out concurrently, that is, with each of the components of the reaction product being mixed together and heated to reaction temperature, or the fatty acid ester can be reacted first with monomer and then with the acidic component. However, because the monomer and the acid or anhydride are often quite reactive with each other, the oil or other fatty acid ester is in most instances preferably first reacted with the acid or acid anhydride and then this product is subsequently reacted with any ethylenically unsaturated monomer or monomers employed. For example, a reaction product of linseed oil, maleic anhydride and styrene is ordinarily prepared by first reacting maleic anhydride with linseed oil, and then reacting the maleinized oil with styrene. When the process is carried out in this manner, the reaction of the additional monomer with the initial reaction product is usually carried out at somewhat lower temperatures, usually between about 25° C. and 200° C.

The proportions of each of the components going to make up the reaction product are ordinarily not critical. In most instances, between about 8 percent and about 45 percent by weight of the unsaturated acid or acid anhydride is reacted with from about 55 percent to about 92 percent by weight of fatty acid ester. In the presently preferred products, usually 12 percent to 30 percent of anhydride and 70 percent to 88 percent of oil ester are employed. If an ethylenically unsaturated monomer is incorporated in the reaction product, it is typically used in amounts between about 5 percent and about 35 percent by weight based upon the total weight of acid or anhydride and ester.

The product obtained by reacting the fatty acid ester and the dicarboxylic acid or anhydride (and the ethylenically unsaturated monomer, if any) contains recurrent groups derived from the dicarboxylic acid or anhydride and which can be represented by the following structure:

(II) 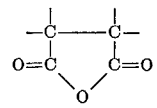

The improved compositions of the present invention are obtained by reacting the recurrent groups as described above with a diol, so as to esterify at least some of the carboxyl groups of the dicarboxylic acid (or the corresponding anhydride groups). While quite low levels of esterification, for example, 10 percent of the acidic groups provide usable products, it is important to provide sufficient alcohol in the esterification mixture to prevent cross-linking to the extent of gelation.

Unreacted diol can be removed, but it is preferred to employ the amount of diol desired to be reacted; thus for practical purposes, at least about 0.6 mole of diol is utilized per mole of dicarboxylic acid or anhydride, or when lesser amounts are used some monohydric alcohol is added.

In the preferred products, about 50 percent of the dicarboxylic acid carboxyl groups are esterified hence a 1 to 1 molar ratio of diol to acid or anhydride is usually employed, although higher proportions can be used. It is desirable that the esterified product have an acid value of at least about 20, if it is to be employed in a water-dispersed composition.

In the preferred compositions, all or part of the foregoing groups of the structure (II) are thus converted to groups which have the following structure:

(III) 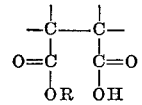

where R is a hydroxyl-containing organic radical derived by elimination of one hydroxyl group from the diol employed. The partially esterified structure illustrated is known as the half-ester of the dicarboxylic acid group.

Essentially any diol can be employed to produce these half-esters, including, for example, ethylene glycol, 1,2-propylene glycol, 1,3-propylene glycol, 1,4-butanediol, 1,5-pentanediol, 2-methyl-2-n-propyl-1,3-propenediol and similar higher or substituted alkylene glycols, containing up to about 20 carbon atoms or more. There may also be employed the glycol ethers, such as diethylene glycol, triethylene glycol, poly(oxytetramethylene)glycols and the like, those having molecular weights of up to about 400 being most useful. Especially good results in electro-deposited coatings have been obtained using 2,2-bis(4-hydroxylcyclohexyl)propane, neopentyl glycol and 1,1'-isopropylidinebis(p-phenyleneoxy)di-2-propanol. Other polyols, e.g., trimethylolpropane, are useful to some extent, for example, in place of part of the diol or in conjunction with a monohydric alcohol, and esters made in this manner are within the scope of the invention. Avoidance of gelation is the chief problem when such polyols are employed.

It is preferred that only up to about half of the carboxyl groups or the anhydride groups derived therefrom are esterified by reaction with the diol. This is relatively easily accomplished because the half-ester of all the dicarboxylic acid moieties present is in most cases preferentially obtained upon reaction with an alcohol before the full ester of any of the dicarboxylic acid groups begins to be formed. In addition, production of the full ester generally requires more stringent conditions, such as higher temperatures, even when an excess of alcohol is present. Even when only half of the acid groups are to be esterified, it is not necessary that each dicarboxylic acid form the half-ester. Thus, some of the dicarboxylic acid groups may be fully esterified. In actual practice, however, the half-esters of the dicarboxylic acid moieties are usually obtained, due to the preferential reactivity of the first carboxyl group in each dicarboxylic acid unit.

Generally, the esterification reaction with the diol is carried out by admixing the initial reaction product of the fatty acid ester and the acid or anhydride with the diol. The reaction at room temperature is quite slow, and thus it is preferred to heat the reaction mixture moderately, i.e., to a temperature above about 60° C. The maximum temperature is not critical, but for practical purposes depends upon the properties of the diol used. In most cases temperatures below about 180° C. are employed; prolonged heating above this temperature may in some cases cause incipient gel formation and insolubility of the product.

The amine-aldehyde products employed herein are aldehyde condensation products of melamine, urea, benzoguanamine, or a similar compound. They may be watersoluble or they may be organic solvent-soluble. Generally, the aldehyde employed is formaldehyde, although useful products can be made from other aldehydes, such as acetaldehyde, crotonaldehyde, acrolein, benzaldehyde, furfural, and others. Condensation products of melamine, urea and benzoguanamine are the most common and are preferred, but products of other amines and amides in which at least one amino group is present can also be employed.

For example, such condensation products can be produced from triazines, diazines, triazoles, guanidines, guanamines, and alkyl and aryl-substituted derivatives of such compounds, including alkyl-substituted, aryl-substituted and cyclic ureas, and alkyl and aryl-substituted melamines. Some examples of such compounds are N,N'-dimethyl urea, benzyl urea, N,N'-ethylene urea, diazine diamide, formaguanamine, acetoguanamine, ammeline, 2-chloro-4,6-diamino, 1,3,5-triazine, 3,5-diaminotriazole, 4,-6 - diaminopyrimidine, 2,4,6 - triphenyltriamino - 1,3,5-triazine, and the like.

These aldehyde condensation products contain methylol groups or similar alkylol groups, depending upon the particular aldehyde employed. Ordinarily, in producing amine-aldehyde condensation products, all or part of these methylol groups are etherified by reaction with an alcohol to produce an alkylated product. In the present invention, there are employed those condensation products which are substantially completely alkylated. By this it is meant that all or substantially all of the methylol groups have been etherified; generally speaking, those products containing not more than an average of about one unalkylated alkylol group per molecule are utilized.

Various alcohols can be employed for the etherification of the alkylol groups. These include essentially any monohydric alcohol, with the preferred alcohols being methanol, ethanol, propanol, butanol, and other lower alkanols having up to about 5 carbon atoms, including isomers such as 2-methyl-1-propanol. There can also be employed alcohols such as the lower alkyl monoethers of ethylene glycol and the like; for instance, ethyl Cellosolve and butyl Cellosolve. Higher alcohols can be used but are less desirable because they tend to affect the film properties of the baked film. When the alkylated amine-aldehyde condensate is to be utilized in a vehicle to be employed in a water-dispersed coating composition, it is preferred to employ a water-soluble alcohol in the etherification.

The amine-aldehyde condensation products are produced in a manner well known in the art, using acidic or basic catalysts and varying conditions of time and temperature. The aldehyde is ofen employed as a solution in water or alcohol, and the condensation, polymerization and etherification reactions may be carried out either sequentially or simultaneously.

The vehicles herein can be formulated from the amine-aldehyde condensate and the fatty acid ester-acid product by varying procedures. For example, they can be mixed under conditions such that no appreciable co-reaction takes place, at least prior to baking of a film or coating made therefrom. It is usually best to react the fatty acid ester with the acid or anhydride prior to addition of the amine-aldehyde condensate; the diol and the amine-aldehyde condensate can be added to the acidic product together if desired, and the esterification with the diol then carried out.

At the ordinary temperatures at which esterification using anhydrides is carried out, e.g., 60° C. to 100° C., there is little reaction between the amine-aldehyde product and either the diol or the acidic groups present. At higher temperatures, however, the amine-aldehyde condensate reacts with the hydroxyl groups of the partial ester, and to a lesser extent with the remaining carboxyl groups. If reaction between the partial ester and the amine-aldehyde condensate is desired, the preformed partial ester can be heated with the amine-aldehyde condensate, or the esterification mixture containing the amine-aldehyde product can be heated to the higher temperature necessary. In either case, the temperature should be at least about 100° C., and preferably not higher than about 150° C.

Such co-reacted products are greatly preferred, particularly in vehicles to be employed in electrodeposition processes. Among the advantages obtained is better co-deposition of the amine-aldehyde moieties, better film properties.

The proportion of amine-aldehyde condensate in the vehicle is not critical. Very low amounts and very large amounts can be utilized, especially when co-reaction prior to curing is not desired. However, when the advantages of co-reaction are to be utilized, as in vehicles for electrodeposition, it is important to provide sufficient amine-aldehyde condensate to avoid gelling the mixture during the reaction. At least about 0.5 mole of the amine-aldehyde condensate should be present per equivalent of hydroxyl in the partial ester, and while essentially any excess can be tolerated, the preferred vehicles contain about 1 mole per hydroxyl equivalent.

The vehicle thus obtained contains acidic carboxyl groups remaining from the dicarboxylic acid or anhydride. If the vehicle is to be employed in a water-dispersed composition, at least part of these remaining acidic groups are neutralized by reaction with a base. Inorganic bases, such as metal hydroxides or quaternary ammonium hydroxides, can be used, but it is preferred to employ organic bases, such as amines (including ammonia within the term "amines"). Especially preferred in many cases are water-soluble amines.

There may be utilized for the neutralization any basic primary, secondary, or tertiary amine. These include, for example, alkyl amines such as methylamine, ethylamine, propylamine, butylamine, amylamine, dimethylamine, diethylamine, dipropylamine, dibutylamine, N-methylbutylamine, trimethylamine, triethylamine and tributylamine; cycloalkyl amines, such as cyclohexylamine; unsaturated amines, such as allyl amine, 1,2-dimethylpentenylamine and pyrrole; arylamines, such as aniline; aralkylamines, such as benzylamine and phenethylamine; alkarylamines, such as m-toluidine; cyclic amines, such as morpholine, pyrrolidine, pyridine and piperidine; diamines, such as hydrazine, methylhydrazine, 2,3-toluenediamine, ethylenediamine, 1,2-naphthylene diamine and piperazine; and substituted amines, such as histamine, hydroxylamine, ethanolamine, diethanolamine and triethanolamine. Better stability is often obtained by utilizing a tertiary amine.

All or part of the remaining carboxyl groups can be neutralized. The extent of neutralization depends to some degree upon the proportion of acidic groups that have been esterified; the higher the level of esterification, the larger the porportion of the remaining acidity which should be neutralized. Geneqrlly, at least about 10 percent of the remaining acidity should be neutralized, and preferably at least about 25 percent is neutralized; in pratcice the extent of neutralization is controlled by regulating the pH of the solution. The pH should be at least about 7 and preferably between about 7.5 and about 10.5.

The neutralization reaction is accomplished by mixing the neutralizing base with the interpolymer or the water-dispersed composition. A water solution or other solution of the base may be utilized, and, if desired, moderately elevated temperatures may be employed.

The foregoing products can be employed to provide clear films, or they can be used along with a pigment composition of any conventional type, comprising, for example, iron oxides, lead oxides, strontium chromate, carbon black, titanium dioxide, talc, barium sulfate and the like, as well as combinations of these and similar pigments. Usually, it is preferred that an inhibitive pigment, such as strontium chromate, be included in the pigment composition. Color pigments, such as cadmium yellow, cadmium red, phthalocyanine blue, chronic yellow, toluidine red, hydrated iron oxide and the like may be included if desired, as may be dispersing or surface-active agents. If the composition is to be used for electrodeposition, it is desirable to avoid the use of a cationic type surface-active agent. There may also be included in the coating composition other additives, such as anti-oxidants, wetting agents, driers, anti-foaming agents, bactericides, suspending agents and the like.

The compositions as described above can be applied in any conventional manner, but they are especially adapted to electrodeposition. In electrodeposition processes utilizing these coating compositions, the vehicle is neutralized as described and an aqueous bath containing the composition comprising partially neutralized vehicle is placed in contact with an electrically-conductive anode and an electrically-conductive cathode. The coating is deposited upon the anode, so that the substrate to be coated is used as the anode. It may be of any electrically conductive material; generally used are metals such as iron, steel, aluminum, galvanized steel, phosphatized steel, zinc, copper and the like. Upon the passage of electric current between the anode and the cathode, while in contact with the bath containing the coating composition, an adherent film of the coating composition is deposited upon the anode.

The conditions under which the electrodeposition process is carried out can be those conventionally used in the electrodeposition methods employed heretofore. The applied voltage may be varied greatly, and can be very low, e.g., 1 volt, or very high, e.g., 1000 volts or even higher. It is typically between 50 volts and 350 volts. The initial current density is usually between about 0.1 ampere per square foot and 15 amperes per square foot. The current generally decreases somewhat during electrodeposition.

In some instances, the product has a pH above the desired level. The problem of increased pH is especially encountered in continuous electrodeposition, where there is a tendency to build up a concentration of cations in the electrodeposition bath, manifested by an increase in the pH of the bath. This may be overcome by the addition of unneutralized or only slightly neutralized product to baths employed in continuous electrodeposition, thereby maintaining the desired pH of the bath without adversely affecting the advantageous properties of the composition.

The concentration of the coating composition in the aqueous bath used in electrodeposition is not necessarily critical and relatively high levels of the coating composition can be used. However, it is ordinarily desirable to use as low a concentration of a coating composition as will give satisfactory results. Baths containing as little as about 1 percent by weight of the coating composition in water can be employed, and, in ordinary practice, the baths utilized usually contain between about 5 percent and about 10 percent by weight. Generally, it is preferred not to use more than about 20 percent by weight of the coating composition in the bath.

Electrodeposition produces an adherent film which is very high in solids content, often 80 percent to 90 percent or even higher, which provides the important advantage that the film will not readily run or wash. The article so coated can be used, if desired, without additional baking or other drying procedures; if it is desired to carry out an additional baking or drying of the film, this is easily accomplished, inasmuch as there is relatively little solvent to be evaporated from the film.

The optimum voltages and current densities used may vary depending upon the coating composition used and the particular characteristics desired in the finished coating. Thus, it has been found that thicker films are generally obtained with higher voltages, and that greater throwing power results from use of higher voltages for given film thickness. Usually a maximum film thickness can be obtained with any given composition, and this depends partially upon the conductivity of the bath containing the composition, which in turn depends largely upon the extent of neutralization. However, any of the compositions described above will produce satisfactory coatings having sufficient adherency and thickness using the ordinary methods and conditions heretofore used in electrodeposition processes.

The compositions herein, after application, ordinarily are cured to provide hard, durable and resistant protective coatings which adhere well to various substrates, including iron, steel, treated steels, aluminum, copper, and other metals, as well as glass, wood, plastics and the like. It is, of course, necessary to utilize a conductive surface if the coating is applied by electrodeposition. Curing is ordinarily accomplished by baking at elevated temperatures. A typical baking schedule is 10 to 30 minutes at 300° F. to 400° F., although higher or lower temperatures and shorter or longer times can be employed, time and temperature being correlated to produce the desired extent of cure.

The invention will be described further in conjunction with the following examples, which are illustrative and are not to be construed as limiting the invention to their details. All parts and percentages in the examples and throughout this specification are by weight unless otherwise specified.

EXAMPLE 1

A 4 to 1 weight ratio of linseed oil and maleic anhydride were heated to 250° C. over a 2 hour period and then held at this temperature for 15 minutes. The addition product obtained was reacted with neopentyl glycol by heating a mixture of 2000 parts of the maleinized oil and 400 parts of neopentyl glycol to 90° C., allowing the temperature to drop to about 66° C. over a 4 hour period, and then maintaining the mixture at 66° C. for an additional 3½ hours. Infra-red examination of the product obtained showed that it was the glycol half-ester of the maleinized oil.

A mixture of 1528 parts of the half-ester with 1020 parts of hexakis(methoxymethyl)melamine was heated to 130–135° C. for about 2 hours, while removing about 67 parts of evolved methanol. The product obtained was mixed with deionized water and diethylamine to give a solution having a pH of 10.2 and a solids content of 33.6 percent. A 3 mil wet film of the solution was drawn on a steel panel and baked 20 minutes at 350° F. The baked film was hard, flexible and adherent, and passed a 96 inch-pound impact resistance test with a Gardner variable impact tester, both direct and reverse. The film was als unaffected after exposure to 33 percent sodium hydroxide in water for 20 minutes.

EXAMPLE 2

An addition product was produced and reacted with neopentyl glycol as in Example 1, except that the reaction with glycol was carried out at 65° C. for 7 hours. To 1500 parts of this product there were added 1000 parts of hexakis(methoxymethyl)melamine, and this mixture was heated at 124° C. to 129° C. for 1 hour. A total of 74 parts of methanol were removed during the heating. To this product there were added deionized water and diethylamine in amounts sufficient to give a solution having a pH of 8.3 and a solids content of 10 percent.

This composition was placed in a stirred polyethylene contained and 2 phosphatized steel (Bonderite) panels, 4 inches by 12 inches, were immersed therein to a depth of 6 inches. The panels were spaced 2 inches apart. Using these panels as the electrodes, the composition was electrodeposited on the anodic panel by applying a maximum voltage of 150 volts for 60 seconds. The coated panel was then removed from the paint, washed with water and baked for 20 minutes at 350° F. The film obtained has a Sward hardness (Sward rocker) of 36, impact resistance of 96 inch-pounds, and was resistant to 33 percent aqueous sodium hydroxide solution. Infra-red examination of the coating showed that the coating contained approximately the same proportion of hexakis(methoxymethyl)melamine as was contained in the dispersed coating composition.

EXAMPLE 3

A maleic anhydride-linseed oil adduct was made and reacted with neopentyl glycol as in Example 1. To 836 parts of this product there were added 2090 parts of deionized water, 66.8 parts of diethylamine and 559 parts of hexakis(methoxymethyl)melamine. The components were thoroughly mixed without heating to provide a solution having a pH of 7.6 and a solids content of 37.2 percent. Films were drawn of this solution in the same manner as those in Example 1. After baking, the coating had a Sward hardness of 22, was resistant to alkali, and had other properties similar to the coating produced in Example 1.

Another portion of the solution was mixed with sufficient deionized water to give a 9 percent solids solution which had a pH of 7.6. A panel was coated with this composition, using the electrodeposition procedure of Example 2. A satisfactory coating was obtained with a Sward hardness of 18, but which had a tendency to sag and which deposited less uniformly than that of Example 2. Comparison of the infra-red spectrum of the coating obtained with that of Example 2 showed that the coating of this example had considerably less of the hexakis(methoxymethyl)melamine therein than did that of Example 2.

EXAMPLE 4

A mixture of maleic anhydride and linseed oil containing 20 percent by weight of maleic anhydride was heated to 250° in 2 hours and maintained at this temperature for 15 minutes. The addition product comprised 2000 parts of maleinized oil to which there were added 685 parts of 2,2-bis(4-hydroxycyclohexyl)propane; this mixture was heated at 110–115° C. for 7 hours. To this product there were added 1597 parts of hexakis(methoxymethyl)melamine and heating was continued at about 130° C. while removing methanol. Deionized water and triethylamine were then added to make a composition containing 39.2 percent solids and having a pH of 9.0.

A pigment paste was prepared by grinding the following for 30 minutes:

| | Parts by wt. |
|---|---|
| Resin solution above (39.2% solids) | 114.5 |
| Red iron oxide | 300 |
| Butyl Cellosolve | 20 |
| Triethylamine | 3 |
| Deionized water | 59 |

A coating composition was prepared by mixing 743 parts of the resin solution above (39.2 percent solids) with 99.3 parts of the above pigment paste and sufficient deionized water to produce a solids content of 8 percent. This composition was electrodeposited on steel panels as in Example 2, using a voltage of 190 volts for 60 seconds. The coating was baked for 45 minutes at 325° F. and provided a hard, adherent 0.8 mil thick film with good corrosion and humidity resistance, and which was resistant to 0.1 normal sodium hydroxide solution 100° F.

EXAMPLE 5

A maleinnized oil was prepared as in Example 1 and reacted with 1 mole of diol per mole of maleic anhydride, the diol being 1,1'-isopropylidene bis(p-phenyleneoxy)di-2-propanol. The reaction was carried out at 65° C. for 7 hours and 2640 parts of the product obtained were further reacted with 1170 parts of hexakis(methoxymethyl)melamine at 120° C. to 151° C. until the theoretical amount of methanol had been evolved. There were then added 350 parts of butyl Cellosolve to provide a product having a solids content of 90 percent and an acid number of 21.6. The stability of this product was tested by heating it at 120 F. for 7 days. Essentially no increase in viscosity was noted.

A water-dispersed coating composition was prepared by mixing 1108 parts of the above product with 1392 parts of deionized water and then adding 45 parts of triethylamine. This product, which had a pH of 9.2, was then reduced to 8 percent solids by the addition of deionized water, electrodeposited on steel panels as in Example 2, and baked for 45 minutes at 325° F. A smooth, adherent coating 0.8 mil thick was obtained, having good properties including a Sward hardness of 40.

EXAMPLE 6

Example 2 was repeated, using equivalent molar ratios and a maleic anhydride-linseed oil adduct containing 16 percent by weight of maleic anhydride. Substantially equivalent results were obtained to those in Example 2.

EXAMPLE 7

Example 2 was repeated, using equivalent molar ratios and a maleic anhydride-linseed oil reaction product containing 10 percent by weight of maleic anhydride. Neutralization of the half-ester was carried out with triethylamine. Electrodeposited coatings with satisfactory properties were obtained.

EXAMPLE 8

A maleic anhydride-linseed oil addition product was produced as in Example 1 and then additionally heated at 250° C. for about 3 hours; its viscosity increased to about 60,500 centipoises. This heat-treated product (1060 parts) was reacted with 175 parts of neopentyl glycol at 65° C. for 7 hours and the resulting half-ester was reacted with 652 parts of hexakis(methoxymethyl)melamine by heating the mixture at 140–146° C. while removing methanol. After about one hour's heating, a soft gel began to form and 200 parts of butyl Cellosolve were added. Heating was continued for 1½ hours, while the temperature was allowed to slowly drop to 90° C. The product obtained had a Gardner-Holdt viscosity of Z7 and a solids content of 90.7 percent.

A coating composition was prepared by mixing 333 parts of the foregoing resin with 400 parts of deionized water and 18 parts of triethylamine. After mixing thoroughly, 2200 additional parts of deionized water were slowly added. The resulting clear solution had a solids content of 10 percent and a pH of 8.5. This composition was electrodeposited on steel panels as in Example 2, and produced films having satisfactory appearance and other properties.

Substantially equivalent results to those described above are obtained by substituting other materials within the invention for the corresponding materials used in the foregoing examples. For example, other oils and other fatty acid ester esters can be reacted with varying acids and anhydrides, and the resulting addition products employed in the manner described. These include, for example, the following:

(1) The product of 400 parts of oiticica oil and 100 parts of maleic anhydride, reacted at 150° C.–220° C. for 1 hour;

(2) The product of 700 parts of maleic anhydride and an epoxy ester made by reacting 700 parts of an epoxy resin (Epon 828) with 2240 parts of tall oil fatty acids.

(3) The product obtained by heating 1600 parts of tung oil and 400 parts of fumaric acid at 180° C. for 1 hour;

(4) The product obtained by reacting 1920 parts of linseed oil and 480 parts of maleic anhydride at 220° C. for 3 hours, and then further reacting this product with 600 parts of styrene at 150° C. for 4 hours in the presence of di-t-butyl peroxide;

(5) The product obtained by reacting maleic anhydride with the reaction product of 300 parts of resin acids, 1360 parts of linseed oil and 40 parts of trimethylolethane.

Similarly, various other diols and amine-aldehyde condensation products can be utilized in place of those of the examples. Among these are the several specific materials mentioned hereinabove, as well as others of the classes described.

According to the provisions of the patent statutes, there are described above the invention and what are now considered to be its best embodiments. However, within the scope of the appended claims, it is to be understood that the invention can be practiced otherwise than as specifically described.

We claim:

1. A method of coating a conductive substrate which comprises passing electric current between an electrically conductive anode and an electrically conductive cathode in contact with a water-dispersed coating composition, said coating composition containing an at least partially neutralized vehicle comprising
   (1) the partial ester of a diol and the addition product of a drying oil fatty acid ester and an acidic compound selected from the group consisting of anhydrides of alpha-beta-ethylenically unsaturated dicarboxylic acids, alpha-beta-ethylenically unsaturated dicarboxylic acids which form anhydrides, and fumaric acid; and
   (2) a substantially completely alkylated amine-aldehyde condensation product.

2. The method of claim 1 in which said partial ester is formed from at least about 0.6 mole of said diol per mole of said acidic compound.

3. A method of coating a conductive substrate which comprises passing electric current between an electrically conductive anode and an electrically conductive cathode in contact with a water-dispersed coating composition in which the film-forming component comprises an at least partially neutralized reaction product of
   (1) the partial ester of a diol and the addition product of a drying oil fatty acid ester and an acidic compound selected from the group consisting of anhydrides of alpha-beta-ethylenically unsaturated dicarboxylic acids, alpha-beta- ethylenically unsaturated dicarboxylic acids which form anhydrides, and fumaric acid; and
   (2) a substantially completely alkylated amine-aldehyde condensation product.

4. The method of claim 3 in which said addition product contains from about 8 percent to about 45 percent by weight of said acidic compound and said partial ester is formed from at least about 0.6 mole of said diol per mole of said acidic compound.

5. The method of claim 3 in which the pH of said water-dispersed coating composition is between about 7.5 and about 10.5.

6. The method of claim 3 in which said reaction product is at least partially neutralized with a water-soluble amine.

7. The method of claim 3 in which said acidic compound is maleic anhydride.

8. The method of claim 3 in which said amine-aldehyde condensation product is a substantially alkylated melamine-formaldehyde condensation product.

9. The method of claim 3 in which said partial ester is the half-ester of said addition product and about one mole of said amine-aldehyde condensation product per hydroxyl equivalent of said half-ester is present.

10. The method of claim 3 in which said acidic compound is maleic anhydride, said amine-aldehyde condensation product is a substantially methylated melamine-formaldehyde condensation product and said diol is selected from the group consisting of neopentyl glycol, 1,1-isopropylidinebis(paraphenyleneoxy)di-2-propanol, and 2,2-bis(4-hydroxycyclohexyl)-propane.

References Cited

UNITED STATES PATENTS

| 2,398,569 | 4/1946 | Widmer | 260—21 |
| 2,816,874 | 12/1957 | Schmutzler | 260—21 |
| 3,230,162 | 1/1966 | Gilchrist | 204—181 |
| 3,278,469 | 10/1966 | Pascale | 260—21 |
| 3,308,077 | 3/1967 | Pattison et al. | 260—21 |
| 3,329,739 | 7/1967 | Semroc | 260—21 |
| 3,340,172 | 9/1967 | Huggard | 204—181 |
| 3,382,294 | 5/1968 | Christenson et al. | 260—21 |
| 3,403,088 | 9/1968 | Hart | 204—181 |
| 2,188,888 | 1/1940 | Clocker | 260—18 |

HOWARD S. WILLIAMS, Primary Examiner

U.S. Cl. X.R.

117—161; 260—18, 21